United States Patent
He

(10) Patent No.: US 9,917,602 B2
(45) Date of Patent: Mar. 13, 2018

(54) ANTENNA SYSTEM, INTEGRATED COMMUNICATION STRUCTURE AND TERMINAL

(71) Applicant: Yulong Computer Telecommunication Scientific (Shenzhen) Co., Ltd., Shenzhen (CN)

(72) Inventor: Chun He, Shenzhen (CN)

(73) Assignee: Yulong Computer Telecommunications Scientific (Shenzhen) Co., Ltd., Shenzhen, Guangdong (CN)

( * ) Notice: Subject to any disclaimer, the term of this patent is extended or adjusted under 35 U.S.C. 154(b) by 28 days.

(21) Appl. No.: 15/034,639

(22) PCT Filed: Dec. 21, 2013

(86) PCT No.: PCT/CN2013/090172
§ 371 (c)(1),
(2) Date: May 5, 2016

(87) PCT Pub. No.: WO2015/089851
PCT Pub. Date: Jun. 25, 2015

(65) Prior Publication Data
US 2016/0277042 A1    Sep. 22, 2016

(51) Int. Cl.
*H04B 1/00* (2006.01)
*H04B 15/02* (2006.01)
(Continued)

(52) U.S. Cl.
CPC .......... *H04B 1/0053* (2013.01); *H04B 1/006* (2013.01); *H04B 1/18* (2013.01); *H04B 15/02* (2013.01); *H04W 4/008* (2013.01)

(58) Field of Classification Search
CPC .... H04B 1/0053; H04B 1/0057; H04B 1/006; H04B 15/02; H04B 1/18; H04B 1/005; H04B 1/0064
See application file for complete search history.

(56) References Cited

U.S. PATENT DOCUMENTS

| | | | | |
|---|---|---|---|---|
| 6,381,471 | B1 * | 4/2002 | Dvorkin | H04B 1/406 343/702 |
| 8,509,718 | B2 * | 8/2013 | Khlat | H04B 1/18 455/150.1 |

(Continued)

FOREIGN PATENT DOCUMENTS

| | | |
|---|---|---|
| CN | 101771455 | 7/2010 |
| CN | 102111177 | 6/2011 |

(Continued)

OTHER PUBLICATIONS

English language translation of CN203180917.*

(Continued)

*Primary Examiner* — Sophia Vlahos
(74) *Attorney, Agent, or Firm* — Swanson & Bratschun, L.L.C.

(57) ABSTRACT

Provided are an antenna system, an integrated communication structure and a terminal. The antenna system comprises: a first antenna which is connected to transmission paths of a plurality of communication modules and used for transmitting transmission signals from each of the transmission paths; and a second antenna which is connected to receiving paths of the plurality of communication modules and used for transmitting a received signal from the outside to a corresponding communication module via a corresponding receiving path. By means of the technical solution of the present invention, transmitting antennas and reception antennas of all communication modules in a terminal can be integrated respectively. The number of antennas can be (Continued)

effectively reduced, and the stacking difficulty is reduced, thereby avoiding antenna interference among a plurality of communication devices, and making it easy to realize multi-mode.

12 Claims, 7 Drawing Sheets

(51) Int. Cl.
   *H04B 1/18* (2006.01)
   *H04W 4/00* (2018.01)

(56) References Cited

U.S. PATENT DOCUMENTS

| | | | | |
|---|---|---|---|---|
| 8,942,644 B2* | 1/2015 | Schell | ............... | H04B 1/0064 |
| | | | | 361/13 |
| 9,214,981 B1* | 12/2015 | Park | ............... | H01Q 1/246 |
| 2008/0159363 A1 | 7/2008 | Rofougaran | | |
| 2010/0277252 A1* | 11/2010 | Gorbachov | ............ | H01P 1/213 |
| | | | | 333/104 |
| 2013/0244593 A1 | 9/2013 | Alrabadi | | |
| 2015/0295308 A1 | 10/2015 | Liu | | |

FOREIGN PATENT DOCUMENTS

| | | |
|---|---|---|
| CN | 203180917 | 9/2013 |
| CN | 103392263 | 11/2013 |
| EP | 1521379 | 1/2004 |
| WO | WO 2009/083647 | 7/2009 |
| WO | WO 2012/027703 | 3/2012 |
| WO | WO 2012/049240 | 4/2012 |

OTHER PUBLICATIONS

International Search Report from PCT/CN2013/090172 dated Sep. 12, 2014.
European Search Report from EP 13899889.3 dated Jun. 21, 2017.

* cited by examiner

ANTENNA SYSTEM, INTEGRATED COMMUNICATION STRUCTURE AND TERMINAL

RELATED APPLICATIONS

This application is a 35 U.S.C. § 371 national phase application of PCT/CN2013/090172 (WO 2015/089851), filed on Dec. 21, 2013, entitled "Antenna System, Integrated Communication Structure and Terminal", which is incorporated herein by reference in its entirety.

FIELD

The present disclosure relates to the technical field of communications, and in particular to an antenna system, an integrated communication structure and a terminal.

BACKGROUND

Currently, with the increasing of functions of a terminal, the number of antennas of the terminal is increasing. Antennas of a multi-antenna terminal are generally designed in the following two manners.

Firstly, based on function types of communication modules, antennas for different function modules are designed independently at different locations on the terminal, as shown in FIG. 1. Multiple antennas may exist in one terminal. For example, an LTE mobile phone generally includes a main antenna, a GPS antenna, a BT/WIFI antenna, a diversity antenna, an NFC antenna. A multi-mode terminal may include more antennas. In this case, antennas are arranged on an upper end, a lower end and two sides of the terminal, as shown in FIG. 2. In a case that a few of the antennas are close to one another, performances of the antennas may become poor since strong interference exists between signal transmissions and signal receptions. Therefore, it is difficult to arrange the antennas and give an overall consideration to all the antennas in the limited space inside the terminal, thereby making poor performances of a few of antennas in using the terminal, and affecting user experiences.

Secondly, the antennas for the communication modules are integrated into one antenna by directly adding a filter network and a matching circuit in the terminal. In this case, radio frequency transceiver circuits corresponding to the antennas of the communication modules are needed. The filter network passes a received signal or transmitted signal in an operating frequency band of a respective radio frequency transceiver circuit, while isolates received signals or transmitted signals in operating frequency bands of other radio frequency transceiver circuits, and the matching circuit matches impedances of the antennas with impedances of the radio frequency transceiver circuits, as shown in FIG. 3. This solution can be only applied in combining multiple frequency bands or simply combining GPS and BT/WIFI but can not achieve a multi-mode multi-pass communication, since the antenna is not separated into a transmission antenna and a reception antenna in this solution.

Therefore, it is an urgent issue to be solved that how to reduce interference between multiple antennas and achieve the multi-mode multi-pass communication.

SUMMARY

In order to address the above issue, the present disclosure provides an antenna system, an integrated communication structure and a terminal, which can achieve isolation among the multiple antennas and can be applied in a multi-mode terminal.

In view of the above, the present disclosure provides an antenna system. The antenna system includes: a first antenna and a second antenna. The first antenna is connected to transmission paths of multiple communication modules and is configured to transmit transmission signals from the transmission paths; and the second antenna is connected to reception paths of the multiple communication modules and is configured to transfer signals received from an outside to the communication modules via the reception paths corresponding to the communication modules.

In the technical solution, a transmission function and a reception function of each of the communication modules are separated; hence antennas of the multiple communication modules may be integrated into two antennas, i.e. the first antenna only for a user sending a signal and the second antenna only for the user receiving a signal, thereby effectively reducing the number of antennas and reducing a stacking difficulty.

The distance between the first antenna and the second antenna is maximized to increase isolation between the antennas, thereby reducing interference between the first antenna and the second antenna. For example, the first antenna may be arranged at a lower portion of the terminal and the second antenna may be arranged at an upper portion of the terminal.

Moreover, the first antenna and the second antenna each may simultaneously transmit a signal and receive a signal and achieve duplex modes of the modules. In this case, the multi-mode multi-pass communication can be achieved with fewer components such as duplexer, triplexer and multiplexer, thereby reducing a component cost and an area of a PCB layout.

In the above technical solution, preferably, the antenna system may further include an interference isolation device, where the interference isolation device is arranged between each of the transmission paths and the first antenna and is configured to isolate interference signals reflected to the transmission paths to which the interference isolation device is connected.

With the technical solution, the interference isolation device is arranged between each of the transmission paths and the first antenna. In this way, a signal can only be transferred from a communication module to the first antenna and be transmitted outwardly via the first antenna, and a signal is prevented from being transferred from the first antenna to the communication module, thereby effectively isolating interference signals reflected to the transmission paths and achieving the stable output of the transmission paths.

There are many components, circuits or apparatus for achieving the functions of the above interference isolation device. As a preferable embodiment, for example, an isolator may be chosen. Of course, it should be understood by those skilled in the art that, the interference isolation device is not limited to the isolator herein.

In the above technical solution, preferably, in a case that the communication module supports multiple communication frequency bands, the communication module may be connected to a transmission antenna via multiple transmission paths and connected to a reception antenna via multiple reception paths; and a one-to-one correspondence may exist between the communication frequency bands, the transmission paths and the reception paths.

With the technical solution, for the multi-band communication module, a transmission path and a reception path are provided for each of the frequency bands, and a one-to-one correspondence exists between the communication frequency bands, the transmission paths and the reception paths. In this way, receptions and transmissions for the respective frequency bands in a single module are completed, thereby achieving a multi-band multi-pass communication in the same module and effectively managing the multiple frequency bands of the same communication module.

In the above technical solution, preferably, in a case that the communication module supports multiple communication frequency bands, the antenna system may further include: a first frequency band selection device and a second frequency band selection device. The first frequency band selection device is connected to multiple transmission paths of the communication module and is configured to select a transmission path from the multiple transmission paths based on a current operating frequency band, to provide a transmission signal to the first antenna via the selected transmission path. The second frequency band selection device is connected to multiple reception paths of the communication module and is configured to select a reception path from the multiple reception paths based on the current operating frequency band to transfer a signal received from the second antenna to the communication module via the selected reception path.

In the above technical solution, since only one frequency of the multiple frequency bands of the same communication module is used at the same time, a currently used frequency band may be selected with the first/second frequency band selection device, thereby combining the transmission/reception paths corresponding to the multiple frequency bands and simplifying a line structure.

In the above technical solution, preferably, multiple transmission feed points may be arranged on the first antenna, and the transmission path may be connected to the first antenna via one of the transmission feed points corresponding to the transmission path; and multiple reception feed points may be arranged on the second antenna, and the reception path may be connected to the second antenna via one of the reception feed points corresponding to the reception path.

By arranging multiple feed points on the first and second antennas, excitations may be performed with the respective feed points to achieve an optimum signal radiation, in a case that different transmission/reception paths are used to perform communications. Since different feed points are integrated into a single transmission/reception antenna, multiple feed points share an antenna region, thereby optimizing the antenna design. Moreover, locations of the feed points may be adjusted. In this case, a feed point may be selected flexibly in an antenna debugging process, thereby improving flexibility in the antenna debugging.

In the above technical solution, preferably, in a case that the communication module supports multiple communication frequency bands, the antenna system may further include: a first feed point selection device and a second feed point selection device. The first feed selection device is connected to the multiple transmission feed points corresponding to the multiple transmission paths of the communication module and is configured to select a transmission feed point from the multiple transmission feed points based on a current operating frequency band, to connect and match the selected transmission feed point with one of the transmission paths currently being in an operating state. The second feed point selection device is connected to the multiple reception feed points corresponding to the multiple reception paths of the communication module and is configured to select a reception feed point from the multiple reception feed points based on the current operating frequency band, to connect and match the selected reception feed point with one of the reception paths currently being in an operating state.

In the technical solution, since the first/second feed point selection device is arranged and a feed point is selected based on a currently used communication frequency band, the currently used communication frequency band is matched with the selected feed point, thereby achieving an optimum antenna radiation effect.

In a second aspect, an integrated communication structure is further provided according to the present disclosure. The integrated communication structure includes: at least one antenna system according to any one of the above technical solutions and multiple communication modules connected to the at least one antenna system.

In the technical solution, a transmission function and a reception function of each of the communication modules are separated. In this way, antennas of multiple communication modules may be integrated into two antennas, i.e. a first antenna only for a user sending a signal and a second antenna only for the user receiving a signal, thereby effectively reducing the number of antennas and reducing a stacking difficulty.

In the above technical solution, preferably, the communication modules connected to the antenna system may include at least one of a wireless mobile communication module, a Global Positioning System module, a Bluetooth module, a Wireless Local Area Network module and a diversity module, or a combination thereof.

Of course, it should be understood by those skilled in the art that, a transmission function and a reception function of a transmission antenna and/or a reception antenna, of any other type of communication module which may be arranged in a terminal, may also be separated in the above manner, and the transmission antenna and/or reception antenna of the communication module may be integrated with antennas of other communication modules.

Moreover, it should be noted that, in any one of the communication modules according to the present disclosure, a signal transmission and a signal reception may be achieved simultaneously, or only the signal transmission or the signal reception may be achieved. For example, a signal transmission and a signal reception may be achieved simultaneously in the wireless mobile communication module, and only a signal reception can be achieved in the diversity module (corresponding to a diversity antenna).

In a third aspect, a terminal is further provided according to the present disclosure. The terminal includes at least one antenna system according to any one of the above technical solutions, or at least one integrated communication structure according to the above technical solutions.

With the above technical solutions, the transmission antennas and the reception antennas of all the communication modules in the terminal may be integrated respectively, thereby effectively reducing the number of antennas, decreasing a stacking difficulty, avoiding antenna interference between multiple communication devices and achieving a multi-mode multi-pass communication.

It should be appreciated by those skilled in the art that, the embodiments of the present disclosure may be provided as a method, a system or a computer program product. Therefore, the present disclosure may be implemented in a complete hardware manner, a complete software manner or in a software-hardware combined manner. In addition, the present disclosure may be implemented as a computer program product stored in one or more computer usable storage mediums (including but not limited to magnetic disk memory, CD-ROM, optical memory and the like) containing computer usable program codes.

The present disclosure is described with reference to flowcharts and/or block diagrams of methods, apparatuses (systems) and computer program products. It should be understood that, each of flows and/or blocks in the flowcharts and/or block diagrams and a combination of the flows and/or blocks in the flowcharts and/or block diagrams may be implemented with computer program instructions. These computer program instructions may be provided to a general-purpose computer, a special-purpose computer, an embedded computer or processors of other programmable data processing apparatuses to form a machine. In this case, a device is formed with instructions executed by the computer or by the processors of other programmable data processing apparatuses, to realize functions specified by one or more flows of the flowcharts and/or specified by one or more blocks of the block diagrams.

Alternatively, these computer program codes may be stored in a computer readable memory which can guide the computer or other programmable data processing apparatuses to operate in a specified manner. In this case, a manufacture including an instruction device is formed by instructions stored in the computer readable memory, and the functions specified by one or more flows of the flowcharts and/or one or more blocks of the block diagrams are realized by the instruction device.

Alternatively, these computer program codes may be loaded to the computer or other programmable data processing apparatuses, hence a series of operation steps are performed by the computer or other programmable apparatuses as processed by the computer. In this case, instructions executed by the computer or other programmable apparatuses provides steps for realizing functions specified by one or more flows of the flowchart and/or specified by one or more blocks of the block diagrams.

DETAILED DESCRIPTION OF EMBODIMENTS

In the following, the present disclosure are described in detail in conjunction with the drawings and specific embodiments, in order to understand the objects, features and advantages of the present disclosure more clearly. It should be noted that, the embodiments and features in the embodiments of the present disclosure can be combined with one another in a case of no conflict.

Many specific details are set forth in the following descriptions to sufficiently understand the present disclosure. The present disclosure may also be implemented in other ways different from the ways described herein. Therefore, the scope of protection of the present disclosure is not limited to the specific embodiments disclosed hereinafter.

Figure 1:
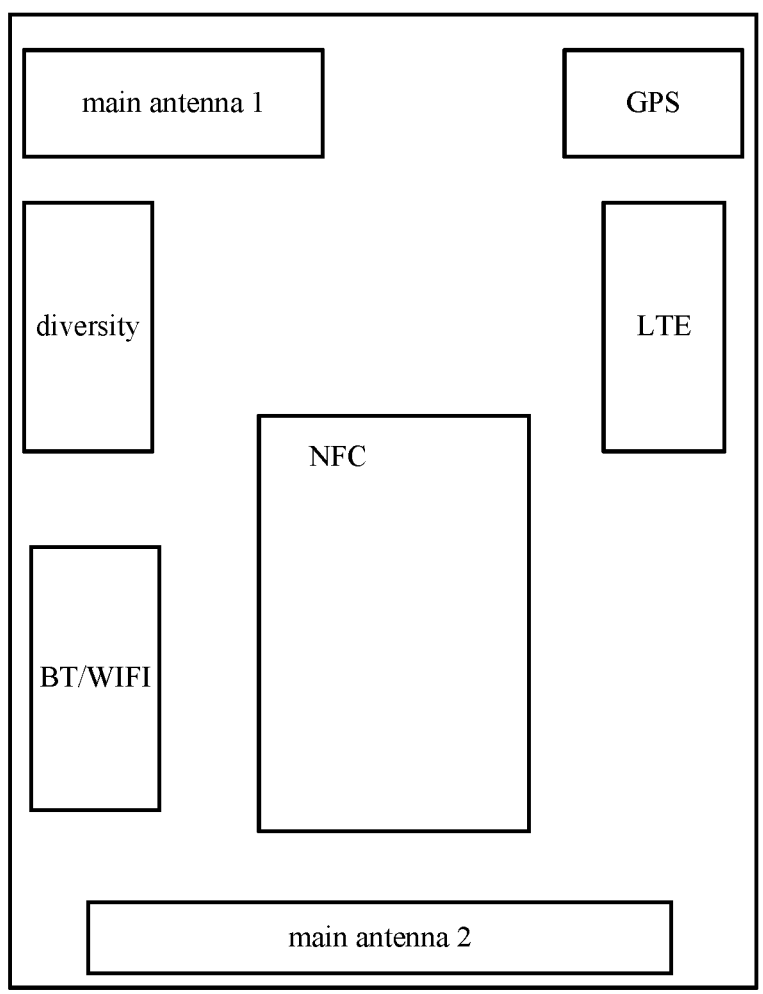
FIG. 1 shows a schematic diagram of a terminal with multiple antennas which are designed independently according to the related technology.
Figure 2:
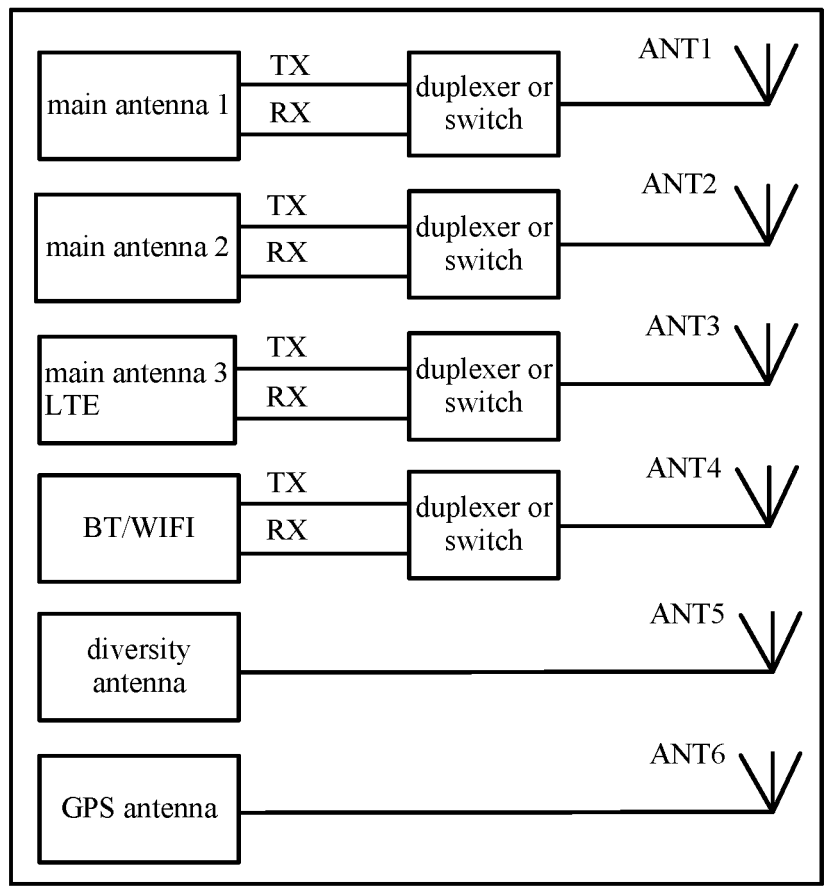
FIG. 2 is a schematic diagram of a principle of the terminal with multiple antennas which are designed independently shown in FIG. 1.
Figure 3:
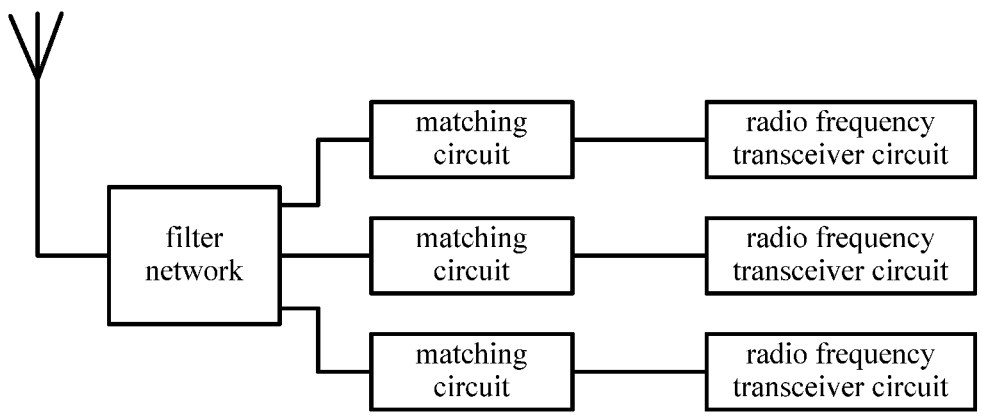
FIG. 3 shows a schematic diagram of an antenna shared by multiple frequency bands according to the related technology.
Figure 4:
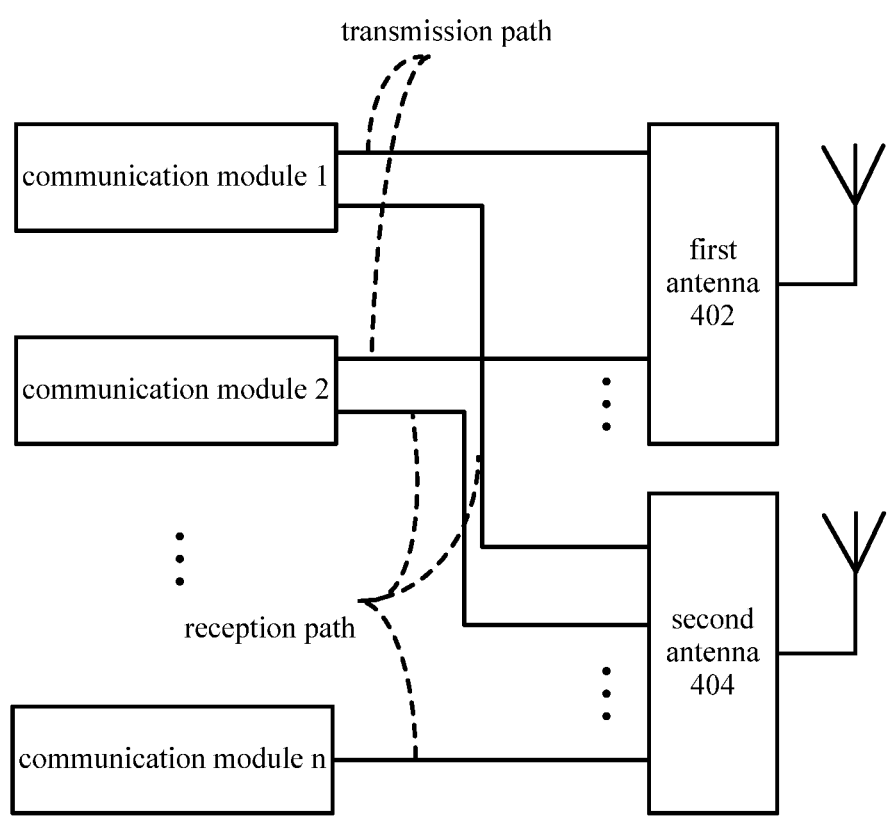
FIG. 4 shows a schematic structural diagram of an antenna system according to an embodiment of the present disclosure.

FIG. 4 shows a schematic structural diagram of an antenna system according to an embodiment of the present disclosure.

As shown in FIG. 4, an antenna system 400 according to the embodiment of the present disclosure includes a first antenna 402 and a second antenna 404. The first antenna 402 is connected to multiple transmission paths of multiple communication modules and is configured to transmit transmission signals from the transmission paths. The second antenna 404 is connected to reception paths of the multiple communication modules and is configured to transfer signals received from the outside to the communication modules via the reception paths corresponding to the communication modules.

In the technical solution, a transmission function and a reception function of each of the communication modules are separated. In this case, antennas of the multiple communion modules may be integrated into two antennas, i.e., the first antenna 402 only for a user sending a signal and the second antenna 404 only for the user receiving a signal, thereby effectively reducing the number of antennas and reducing a stacking difficulty.

For example, in FIG. 4, the communication modules include a communication module 1, a communication module 2 . . . a communication module n. With the above technical solution according to the present disclosure, for all of antennas of the communication modules 1 to n, the following can be achieved: 1. separating a transmission function and a reception function of each of the communication modules; 2. integrating the transmission functions of the multiple communication modules and integrating the reception functions of the multiple communication modules. Therefore, all of the communication modules can receive and transmit signals only with the first antenna 402 and the second antenna 404.

Moreover, the first antenna 402 and the second antenna 404 each may transmit a signal and receive a signal simultaneously and achieve duplex modes of the modules. In this case, a multi-mode multi-pass communication can be achieved with fewer components such as a duplexer, a triplexer and a multiplexer, thereby reducing a component cost and an area of a PCB layout.

In addition, a signal transmission and a signal reception are generally related to each other, for example, sometimes the both are combined into 'signal transmission-reception'. However, a communication module does not always have a signal transmission function and a signal reception function simultaneously. For example, in FIG. 4, the communication module 1, the communication module 2 and the like may have the signal transmission function and the signal reception function simultaneously and may be provided with transmission paths corresponding to the signal transmission function and reception paths corresponding to the signal reception function. However, the communication module n and the like may only have the signal reception function and may be provided with only a reception path corresponding to the signal reception function; and some communication modules (not shown in the FIG. 4) may only have the signal transmission function and may be provided with only transmission paths corresponding to the signal transmission function.

Based on the structure of the above antenna system, in the following, a connection structure inside a terminal containing the above antenna system is described in detail in conjunction with FIG. 5.

Figure 5:
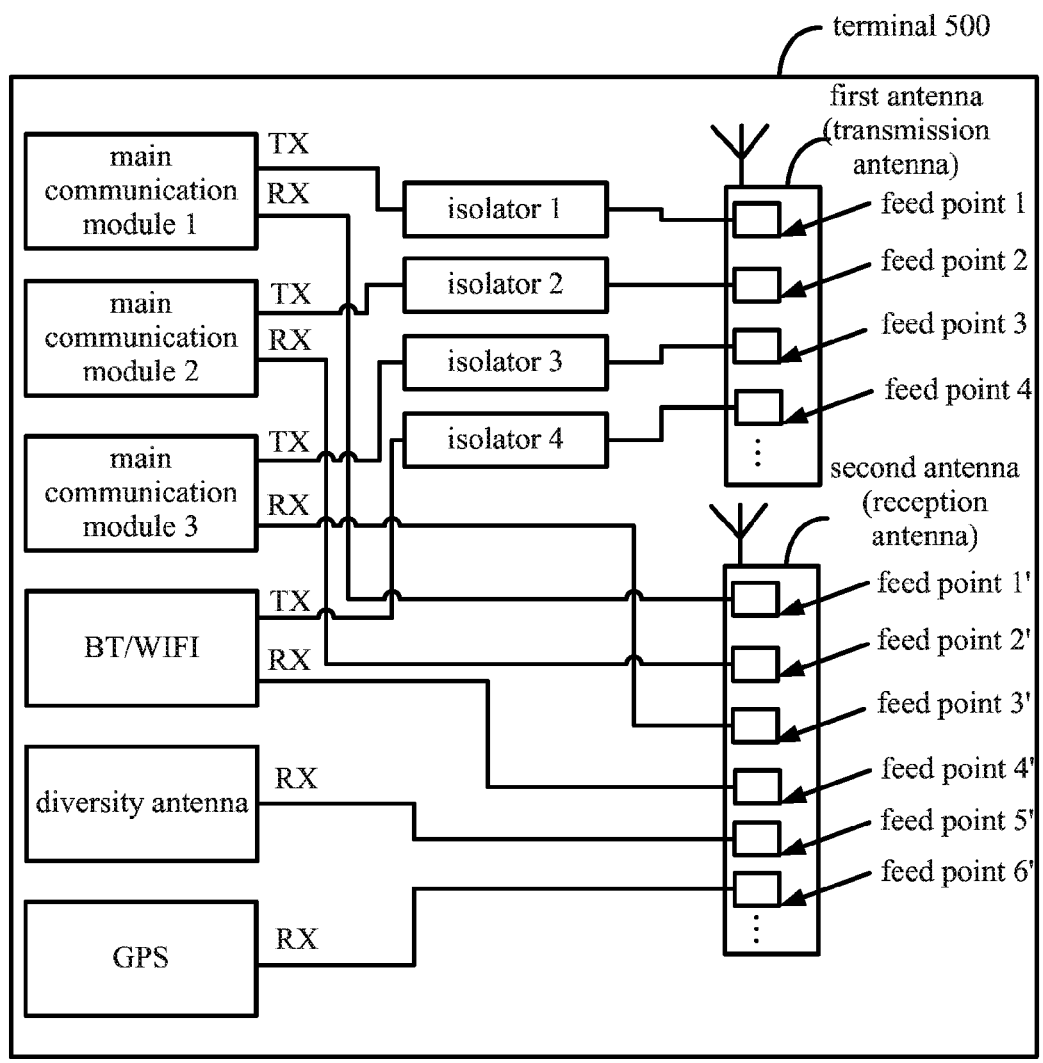
FIG. 5 shows a schematic structural diagram of an antenna design of a multi-mode terminal according to an embodiment of the present disclosure.

FIG. 5 shows a schematic structural diagram of an antenna design of a multi-mode terminal according to an embodiment of the present disclosure.

As shown in FIG. 5, the antenna system shown in FIG. 4 is used in a terminal 500. For simplicity, 'transmission antenna' corresponds to the first antenna 402 shown in FIG. 4 and 'reception antenna' corresponds to the second antenna 404 shown in FIG. 4.

The terminal 500 shown in FIG. 5 contains communication modules such as a main communication module 1, a main communication module 2, a main communication module 3, a WIFI module, a BT (Bluetooth) module, a diversity antenna and a GPS module. Of course, it should be understood by those skilled in the art that, FIG. 5 shows just an example, and it is apparent that the terminal 500 may contain any one or more of the above communication modules or may further contain communication modules of other types.

The main communication module 1, the main communication module 2 and the main communication module 3 indicates that the terminal 500 may be a three-mode terminal. Further, it may be assumed that the main communication module 1 is a CDMA module, the main communication module 2 is a GSM (or WCDMA) module, and the main communication module 3 is an LTE module.

In a case that a certain communication module, such as the main communication module 1 shown in FIG. 5, has a signal transmission function, the communication module may be connected to the transmission antenna via a transmission path (TX, i.e. Transmission, shown in the FIG. 5) corresponding to the communication module. The transmission path may be connected to an output end of a power amplifier (PA) in the communication module. In a case that a certain communication module, such as the diversity antenna (or the diversity module) shown in FIG. 5, has a signal reception function, the communication module may be connected to the reception antenna via a reception path (RX, i.e. Reception, shown in the FIG. 5) corresponding to the communication module.

Since communication frequency bands/operating frequency bands of the respective communication modules are different, multiple different feed points are arranged on the transmission antenna and the reception antenna, and are connected to different transmission paths or reception paths to achieve a signal radiation effect which matches with the feed points.

For example, in FIG. 5, for the transmission antenna, the main communication module 1 is connected to a feed point 1 of the transmission antenna, the main communication module 2 is connected to a feed point 2 of the transmission antenna, the main communication module 3 is connected to a feed point 3 of the transmission antenna, and the WIFI/BT module is connected to a feed point 4 of the transmission antenna; and for the reception antenna, the main communication module 1 is connected to a feed point 1' of the reception antenna, the main communication module 2 is connected to a feed point 2' of the reception antenna, the main communication module 3 is connected to a feed point 3' of the reception antenna, the WIFI/BT module is connected to a feed point 4' of the reception antenna, the diversity antenna is connected to a feed point 5' of the reception antenna, and the GPS module is connected to a feed point 6' of the reception antenna.

Preferably, the terminal 500 may further include interference isolation devices arranged between the transmission paths and the first antenna and configured to isolate interference signals reflected to the transmission paths to which the interference isolation devices are connected.

With the technical solution, the interference isolation device is arranged between each of the transmission paths and the first antenna. In this case, a signal can only be transferred from the communication module to the first antenna and be transmitted outwardly via the first antenna, and a signal is prevented from being transferred from the first antenna to the communication module, thereby effectively isolating interference signals reflected to the transmission paths and achieving the stable output of the transmission paths.

There are many components, circuits, or apparatus for achieving the functions of the above interference isolation device. As a preferable embodiment, an isolator may be chosen. For example, in the embodiment shown in FIG. 5, the main communication module 1, the main communication 2, the main communication 3 and the WIFI/BT module are respectively connected to the feed points on the transmission antenna via isolators. Of course, it should be understood by those skilled in the art that, the interference isolation device is not limited to the isolator herein.

Figure 6:
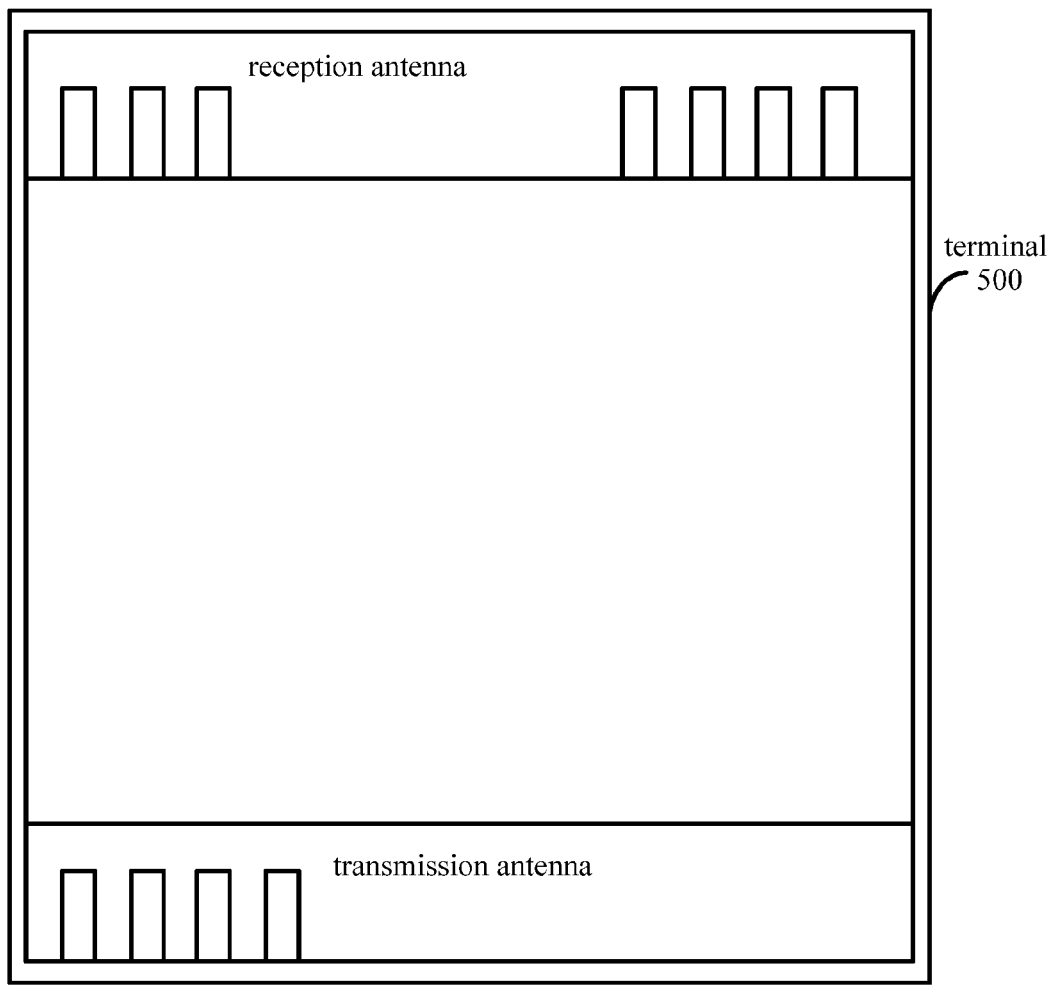
FIG. 6 shows a schematic diagram of locations where a reception antenna and a transmission antenna are respectively arranged according to an embodiment of the present disclosure.

FIG. 6 shows a schematic diagram of locations where a reception antenna and a transmission antenna are respectively arranged according to an embodiment of the present disclosure.

As shown in FIG. 6, the transmission antenna is arranged at a lower portion of the terminal 500, and the reception antenna is arranged on an upper portion of the terminal 500. The distance between the transmission antenna and the reception antenna is maximized to increase isolation between the antennas, thereby reducing interference between signals.

Of course, it should be understood by those skilled in the art that, locations and structures of the transmission antenna and the reception antenna are not limited to those in the terminal 500. For example, as another embodiment, it is apparent that the transmission antenna may be arranged at the upper portion of the terminal 500 and the reception antenna may be arranged at the lower portion of the terminal 500.

In the embodiments shown in FIGS. 4 to 6, the transmission path and/or reception path corresponding to each of the communication modules are shown schematically. However, in a case that a communication module supports multiple communication frequency bands simultaneously, more complicated connection relationships may exist in the structure. In the following, antenna connection structures of a multi-band module are described in detail in conjunction with FIG. 7 and FIGS. 8A to 8B.

First Embodiment

Figure 7:
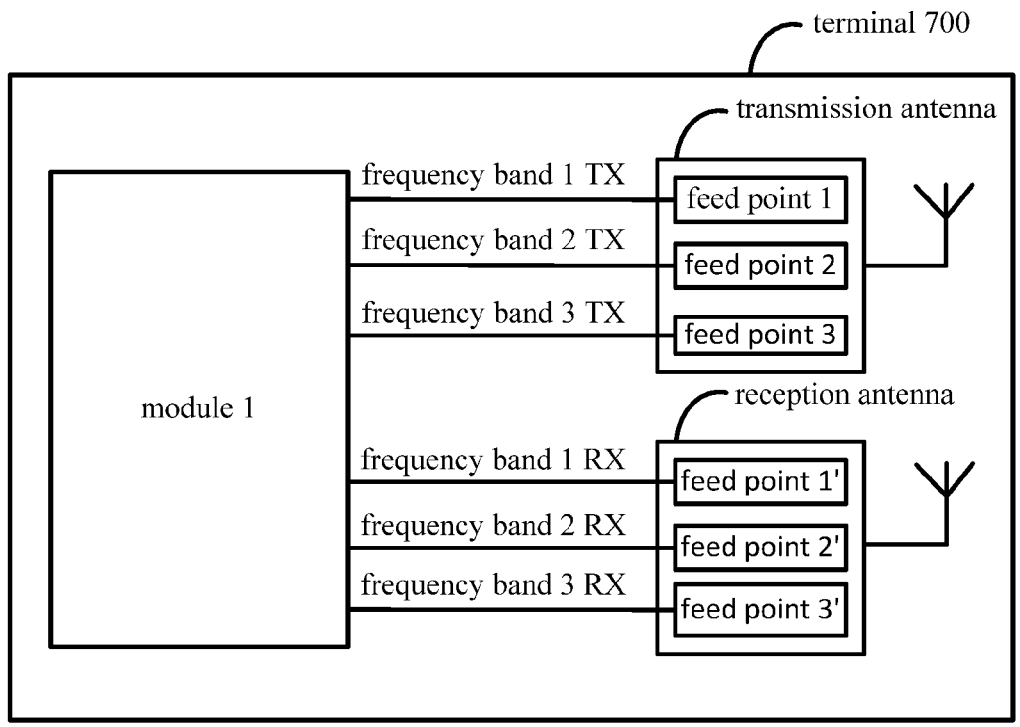
FIG. 7 shows a schematic diagram of connections of antennas of a multi-band module according to an embodiment of the present disclosure.

FIG. 7 shows a schematic diagram of connections of antennas of a multi-band module according to an embodiment of the present disclosure.

As shown in FIG. 7, in the embodiment according to the present disclosure, in a case that a communication module supports multiple communication frequency bands, the communication module is connected to a transmission antenna via multiple transmission paths and is connected to a reception antenna via multiple reception paths. A one-to-one correspondence exists between the communication frequency bands, the transmission paths and the reception paths.

Specifically, it is assumed that the multi-band module is a module 1 in FIG. 7 and the module 1 supports communication frequency bands such as a frequency band 1, a frequency band 2 and a frequency band 3. In one aspect, the module 1 is connected to a feed point 1, a feed point 2 and a feed point 3 on the transmission antenna via three transmission paths corresponding to the above frequency band 1, frequency band 2 and frequency band 3. In the other aspect, the module 1 is connected to a feed point 1', a feed point 2' and a feed point 3' on the reception antenna via three reception paths.

With the above technical solution, for a multi-band communication module, a transmission path and a reception path are provided for each of the frequency bands, and a one-to-one correspondence exists between the communication frequency bands, the transmission paths and the reception paths. In this case, transmissions and receptions of the respective frequency bands of a single module are completed, thereby achieving a multi-band multi-pass communication in the same module and effectively managing the multiple frequency bands of the same communication module.

Second Embodiment

Figure 8A:
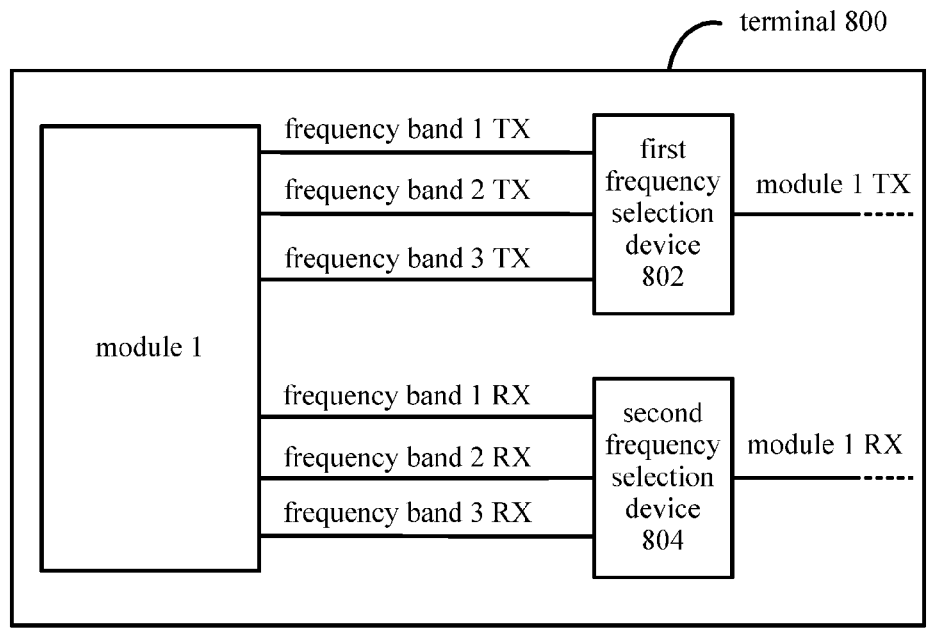
FIGS. 8A and 8B show schematic diagrams of connections of antennas of a multi-band module according to another embodiment of the present disclosure.
Figure 8B:
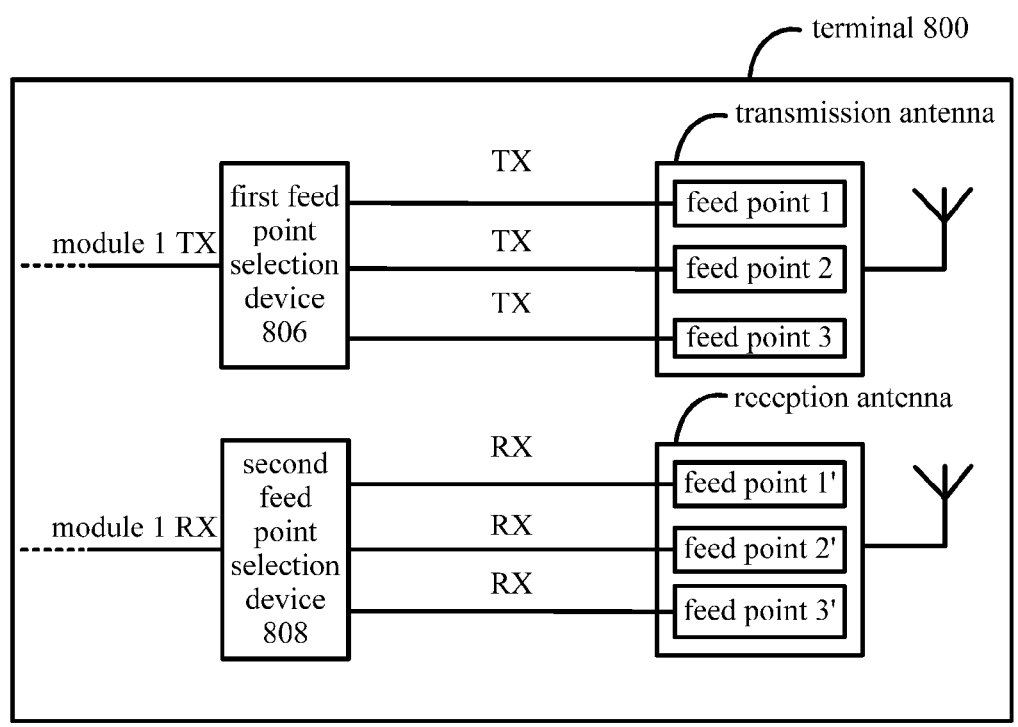

FIGS. 8A and 8B show schematic diagrams of connections of antennas of a multi-band module according to another embodiment of the present disclosure.

In a case that many transmission/reception paths exist since a communication module supports multiple communication frequency bands, the transmission paths and the reception paths of a few of or all of the frequency bands may be combined into one transmission path and one reception path, thereby reducing the number of the transmission/reception paths and simplifying a line structure.

As shown in FIG. 8A, it is assumed that, a module 1 supports a frequency band 1, a frequency band 2, a frequency band 3 and the like in a terminal 800, in order to simplify connection structures of the module 1, the terminal 800 may include: a first frequency band selection device 802 and a second frequency band selection device 804. The first frequency band selection device 802 is connected to multiple transmission paths of the module 1 and is configured to select a transmission path from the multiple transmission paths based on a current operating frequency band, to transmit a transmission signal to a transmission antenna (as shown in FIG. 8B) via the selected transmission path; and the second frequency band selection device 804 is connected to multiple reception paths of the module 1 and is configured to select a reception path from the multiple reception paths based on the current operating frequency band, to transfer a signal received from a reception antenna (as shown in FIG. 8B) to the module 1 via the selected reception path.

In the technical solution, since only one frequency of multiple frequency bands of the same communication module is used at the same time, a currently used frequency band may be selected with the first frequency band selection device 802 and the second frequency band selection device 804, thereby combining the transmission/reception paths corresponding to the multiple frequency bands and simplifying a line structure.

As shown in FIG. 8B, multiple transmission feed points (i.e. a feed point 1, a feed point 2, a feed point 3) may be arranged on the transmission antenna, and the transmission paths of the module 1 are connected to the transmission antenna via the transmission feed points corresponding to the transmission paths; and multiple reception feed points (i.e. a feed point 1', a feed point 2', a feed point 3') may be arranged on the reception antenna, and the reception paths of the module 1 are connected to the reception antenna via the reception feed points corresponding to the reception paths.

By arranging the multiple feed points, in a case that different transmission/reception paths are used to perform communications, excitations may be performed with the feed points corresponding to the transmission/reception paths to achieve an optimum signal radiation. Since different feed points are integrated into a single transmission/reception antenna, multiple feed points share an antenna region, thereby optimizing an antenna design. Moreover, locations of the feed points may be adjusted, and hence a feed point may be selected flexibly in an antenna debugging process, thereby improving flexibility in the antenna debugging.

Preferably, the terminal 800 may further include a first feed point selection device 806 and a second feed point selection device 808. The first feed point selection device 806 is connected to multiple transmission feed points corresponding to the multiple transmission paths of the module 1 and is configured to select a transmission feed point from the multiple feed points based on a current operating frequency band, to connect and match the selected transmission feed point with one of the transmission paths being currently in an operating state. The second feed point selection device 808 is connected to multiple reception feed points corresponding to the multiple reception paths of the module 1 and is configured to select a reception feed point from the multiple reception feed points based on the current operating frequency band, to connect and match the selected reception feed point with one of the reception paths being currently in an operating state.

In the technical solution, the first feed point selection device 806 and the second feed point selection device 808 are arranged and a feed point is selected based on the currently used communication frequency band. In this case, the currently used communication frequency band is matched with the selected feed point, thereby achieving an optimum antenna radiation effect.

Of course, only the embodiment of combining all of the transmission paths/reception paths of the module 1 is shown in FIGS. 8A and 8B. Actually, it is apparent that multiple transmission/reception paths of a communication module may be combined into multiple combined paths, thereby reducing a line complexity and avoiding an excessive complexity of a single combined path.

It should be noted that, the first frequency band selection device 802, the second frequency band selection device 804, the first feed point selection device 806, the second feed point selection device 808 shown in FIGS. 8A and 8B may be implemented with multiple components, circuits or apparatuses. For example, as a preferable embodiment, a switch circuit may be used; as another preferable embodiment, a filter may be used.

Furthermore, an integrated communication structure (not shown in the figures) is further provided according to the present disclosure. The integrated communication structure includes: at least one antenna system according to any one of the above technical solutions and multiple communication modules connected to the at least one antenna system.

Preferably, the communication modules connected to the at least one antenna systems may include at least one of a wireless mobile communication module a Global Positioning System module, a Bluetooth module, a Wireless Local Area Network module and a diversity module, or a combination thereof.

The wireless mobile communication module may be a communication module based on a 2G network such as GSM, may be a communication module based on a 3G network such as WCDMA or CDMA2000, may be a communication module based on a 4G network such as LTE, or may be communication modules based on other network technologies.

Moreover, it should be understood by those skilled in the art that, names of the communication modules listed herein are only used for illustrations. For example, other modules such as a Compass Navigation Satellite System may be applied in the technical solutions according to the present disclosure instead of the 'Global Positioning System module'.

In the above, the technical solutions of the present disclosure are described in detail in conjunction with the drawings. The present disclosure provides an antenna system, an integrated communication structure and a terminal Transmission antennas and reception antennas of all communication modules in the terminal may be integrated respectively, thereby effectively reducing the number of antennas, decreasing a stacking difficulty, avoiding antenna interference between multiple communication apparatuses and achieving a multi-mode multi-pass communication.

It should be appreciated by those skilled in the art that, the embodiments of the present disclosure may be provided as a method, a system or a computer program product. Therefore, the present disclosure may be implemented in a complete hardware manner, a complete software manner or in a software-hardware combined manner. In addition, the present disclosure may be implemented as a computer program product stored in one or more computer usable storage mediums (including but not limited to magnetic disk memory, CD-ROM, optical memory and the like) containing computer usable program codes.

The present disclosure is described with reference to flowcharts and/or block diagrams of methods, apparatuses (systems) and computer program products according to the embodiments of the present disclosure. It should be understood that, each of flows and/or blocks in the flowcharts and/or block diagrams and a combination of the flows and/or blocks in the flowcharts and/or block diagrams may be implemented with computer program instructions. These computer program instructions may be provided to a general-purpose computer, a special-purpose computer, an embedded computer or processors of other programmable data processing apparatuses to form a machine. In this case, a device is formed with instructions executed by the computer or by the processors of other programmable data processing apparatuses, which is configured to realize functions specified by one or more flows of the flowcharts and/or specified by one or more blocks of the block diagrams.

Alternatively, these computer program codes may be stored in a computer readable memory which can guide the computer or other programmable data processing apparatuses to operate in a specified manner. In this case, a manufacture including an instruction device is formed by instructions stored in the computer readable memory. And the functions specified by one or more flows of the flowcharts and/or one or more blocks of the block diagrams are realized by the instruction device.

Alternatively, these computer program codes may be loaded to the computer or other programmable data processing apparatuses, hence a series of operation steps are performed by the computer or other programmable apparatuses as processed by a computer. In this case, instructions executed by the computer or other programmable apparatuses provide steps for realizing the functions specified by one or more flows of the flowchart and/or specified by one or more blocks of the block diagrams.

The above are only the preferable embodiments of the present disclosure and are not intended to limit the present disclosure. Various changes and modifications may be made to the present disclosure by those skilled in the art. Any changes, equivalent substitution, and improvement made within the spirit and principles of the present disclosure are all contained in the scope of protection of the present disclosure.

The invention claimed is:

1. An antenna system, comprising:
   a first antenna, wherein the first antenna is connected to transmission paths of a plurality of communication modules via a plurality of transmission feed points and is configured to transmit transmission signals from the transmission paths; and
   a second antenna, wherein the second antenna is connected to reception paths of the plurality of communication modules via a plurality of reception feed points and is configured to transfer signals received from an outside to the plurality of communication modules via the reception paths corresponding to the plurality of communication modules, wherein at least one of the plurality of communication modules supports a plurality of communication frequency bands;
   a first feed point selection device, wherein the first feed point selection device is connected to transmission feed points corresponding to a plurality of transmission paths of each of the at least one of the plurality of communication modules, and is configured to select a transmission feed point from the transmission feed points based on a current operating frequency band, to connect and match the selected transmission feed point with one of the plurality of transmission paths currently being in an operating state; and
   a second feed point selection device, wherein the second feed point selection device is connected to reception feed points corresponding to a plurality of reception paths of each of the at least one of the plurality of communication modules, and is configured to select a reception feed point from the reception feed points based on the current operating frequency band, to connect and match the selected reception feed point with one of the plurality of reception paths currently being in an operating state.

2. The antenna system according to claim 1, further comprising:
   an interference isolation device, wherein the interference isolation device is arranged between each of the transmission paths and the first antenna and is configured to isolate an interference signal reflected to the transmission path to which the interference isolation device is connected.

3. The antenna system according to claim 2, wherein the interference isolation device comprises an isolator.

4. The antenna system according to claim 1, wherein a one-to-one correspondence exists between the plurality of communication frequency bands, the plurality of transmission paths and the plurality of reception paths.

5. The antenna system according to claim 1, further comprising:
   a first frequency band selection device, wherein the first frequency band selection device is connected to the plurality of transmission paths of each of the at least one of the plurality of communication modules and is configured to select a transmission path from the plurality of transmission paths based on a current operating frequency band, to provide a transmission signal to the first antenna via the selected transmission path; and
   a second frequency band selection device, wherein the second frequency band selection device is connected to the plurality of reception paths of each of the at least one of the plurality of communication modules and is configured to select a reception path from the plurality of reception paths based on the current operating frequency band to transfer a signal received from the second antenna to the communication module via the selected reception path.

6. An integrated communication structure, comprising at least one antenna system and a plurality of communication modules connected to the at least one antenna system,
   wherein the at least one antenna system comprises:
   a first antenna, wherein the first antenna is connected to transmission paths of a plurality of communication modules via a plurality of transmission feed points and is configured to transmit transmission signals from the transmission paths; and
   a second antenna, wherein the second antenna is connected to reception paths of the plurality of communication modules via a plurality of reception feed points and is configured to transfer signals received from an outside to the plurality of communication modules via the reception paths corresponding to the plurality of communication modules, wherein at least one of the plurality of communication modules supports a plurality of communication frequency bands;
   a first feed point selection device, wherein the first feed point selection device is connected to transmission feed points corresponding to a plurality of transmission paths of each of the at least one of the plurality of communication modules, and is configured to select a transmission feed point from the transmission feed points based on a current operating frequency band, to connect and match the selected transmission feed point with one of the plurality of transmission paths currently being in an operating state; and
   a second feed point selection device, wherein the second feed point selection device is connected to reception feed points corresponding to a plurality of reception paths of each of the at least one of the plurality of communication modules, and is configured to select a reception feed point from the reception feed points based on the current operating frequency band, to connect and match the selected reception feed point with one of the plurality of reception paths currently being in an operating state.

7. The integrated communication structure according to claim 6, wherein the plurality of communication modules connected to the at least one antenna system comprise at least one of a wireless mobile communication module, a Global Positioning System module, a Bluetooth module, a Wireless Local Area Network module and a diversity module; or a combination of a wireless mobile communication module, a Global Positioning System module, a Bluetooth module, a Wireless Local Area Network module and a diversity module.

8. A terminal, comprising at least one antenna system or at least one integrated communication structure,
   wherein the at least one antenna system comprises:
   a first antenna, wherein the first antenna is connected to transmission paths of a plurality of communication modules via a plurality of transmission feed points and is configured to transmit transmission signals from the transmission paths;
   a second antenna, wherein the second antenna is connected to reception paths of the plurality of communication modules via a plurality of reception feed points and is configured to transfer signals received from an outside to the plurality of communication modules via the reception paths corresponding to the plurality of communication modules, wherein at least one of the plurality of communication modules supports a plurality of communication frequency bands;
   a first feed point selection device, wherein the first feed point selection device is connected to transmission feed points corresponding to a plurality of transmission paths of each of the at least one of the plurality of communication modules, and is configured to select a transmission feed point from the transmission feed points based on a current operating frequency band, to connect and match the selected transmission feed point with one of the plurality of transmission paths currently being in an operating state; and
   a second feed point selection device, wherein the second feed point selection device is connected to reception feed points corresponding to a plurality of reception paths of each of the at least one of the plurality of communication modules, and is configured to select a reception feed point from the reception feed points based on the current operating frequency band, to connect and match the selected reception feed point with one of the plurality of reception paths currently being in an operating state;
   and wherein the integrated communication structure comprises the at least one antenna system and the plurality of communication modules connected to the at least one antenna system.

9. The integrated communication structure according to claim 6, wherein the at least one antenna system further comprises:
   an interference isolation device, wherein the interference isolation device is arranged between each of the transmission paths and the first antenna and is configured to isolate an interference signal reflected to the transmission path to which the interference isolation device is connected.

10. The integrated communication structure according to claim 9, wherein the interference isolation device comprises an isolator.

11. The integrated communication structure according to claim 6, wherein a one-to-one correspondence exists between the plurality of communication frequency bands, the plurality of transmission paths and the plurality of reception paths.

12. The integrated communication structure according to claim 6, further comprising:
   a first frequency band selection device, wherein the first frequency band selection device is connected to the plurality of transmission paths of each of the at least one of the plurality of communication modules and is configured to select a transmission path from the plurality of transmission paths based on a current operating frequency band, to provide a transmission signal to the first antenna via the selected transmission path; and
   a second frequency band selection device, wherein the second frequency band selection device is connected to the plurality of reception paths of each of the at least one of the plurality of communication modules and is configured to select a reception path from the plurality of reception paths based on the current operating frequency band to transfer a signal received from the second antenna to the communication module via the selected reception path.

* * * * *

UNITED STATES PATENT AND TRADEMARK OFFICE
CERTIFICATE OF CORRECTION

PATENT NO. : 9,917,602 B2  
APPLICATION NO. : 15/034639  
DATED : March 13, 2018  
INVENTOR(S) : Chun He Page 1 of 1

It is certified that error appears in the above-identified patent and that said Letters Patent is hereby corrected as shown below:

On the Title Page

Item (73) Assignee, please replace:
--YULONG COMPUTER TELECOMMUNICATIONS SCIENTIFIC (SHENZHEN) CO., LTD.--
With:
"YULONG COMPUTER TELECOMMUNICATION SCIENTIFIC (SHENZHEN) CO., LTD."

Signed and Sealed this  
Tenth Day of July, 2018

Andrei Iancu  
*Director of the United States Patent and Trademark Office*